July 30, 1963    I. S. LAWSON    3,099,175
POWER CONTROL FOR PRESSES
Filed Oct. 12, 1959
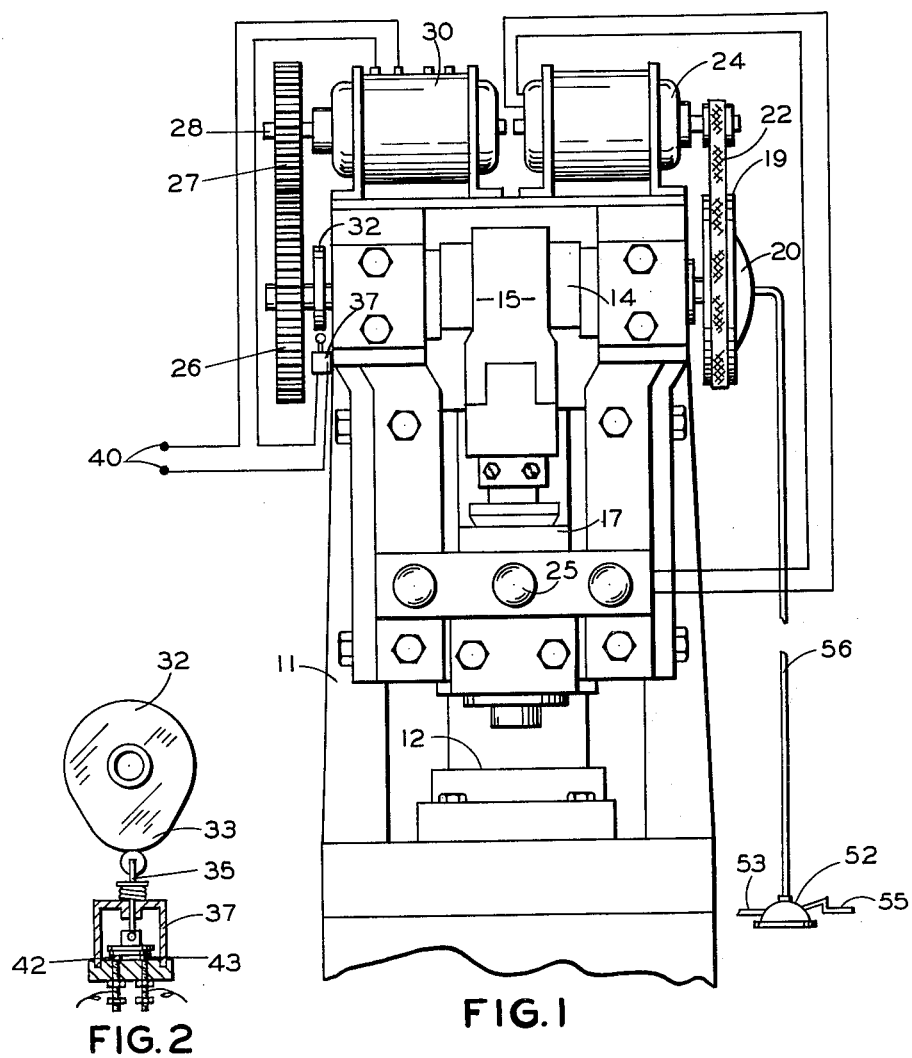
FIG. 2    FIG. 1
FIG. 3
*INVENTOR.*
IVAR S. LAWSON
BY
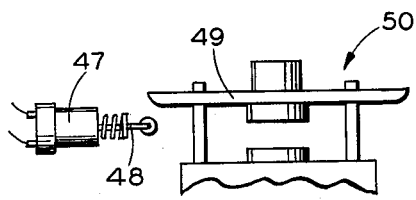
ATTORNEY United States Patent Office 3,099,175
Patented July 30, 1963

3,099,175
POWER CONTROL FOR PRESSES
Ivar S. Lawson, R.F.D. 2, Ashville, N.Y.
Filed Oct. 12, 1959, Ser. No. 845,906
3 Claims. (Cl. 78—39)

This invention relates to metal working machines, such as presses and the like, and is particularly directed to the power input means and control mechanism for such machines.

A primary object of the invention is to provide a press with two stages of power input one of which is preferably of low torque capacity capable of setting the press crank in motion and the other of which is of high torque capacity capable of periodically applying work load torque to the crank at a predetermined point in its work stroke, together with means to control the application of the high torque input to prevent damage to the press in the event of an obstruction in the path of the ram.

Further objects and advantages of the present invention will become apparent from the following description when taken in connection with the accompanying drawing in which:

FIG. 1 is a fragmentary front elevation of a press incorporating the invention;

FIG. 2 is a detail view of one form of control means; and

FIG. 3 is a fragmentary detail view of a modified control mechanism.

Referring to the drawings, the invention has been illustrated as incorporated in a vertical press having a frame 11 provided with a lower die support 12. A main crank 14 is journalled in the frame and has a crank pin or eccentric 15 arranged to vertically reciprocate a tool actuating ram or slide 17. On one end of the crank 14 is mounted a combined flywheel 19 and friction clutch 20 driven in a suitable manner, as by a belt 22, from a drive motor 24 adapted to be connected to a source of current through start switch 25. The other end of crank 14 is provided with a gear 26 in mesh with a pinion gear 27 on the shaft 28 of a second motor 30.

The clutch 20 may be of any suitable type capable of being engaged to connect the flywheel 19 to the crank 14 to rotate the crank and reciprocate the slide 17. Clutch 20 is also capable of slipping in event of overload or in case an obstruction gets in the path of the slide 17. Motor 24, which may be an electric motor as illustrated, or any other suitable type, and herein termed a low torque motor, is capable of continuously driving the flywheel 19 and reciprocating slide 17. It will be noted also that when clutch 20 is engaged and the crank 14 rotated, the motor shaft 28 is likewise driven due to being positively connected to crank 14 by gears 26 and 27. Thus, motor 24 is of sufficient capacity to drive crank 14, slide 17 and motor 30, but incapable of applying work load torque on crank 14 in the event of an obstruction in the path of slide 17.

To apply work load torque to crank 14, motor 30 is energized. This is accomplished at a predetermined point in the reciprocation of slide 17, preferably as the slide approaches its lower dead center. Cam means may be provided on crank 14 as at 32 having a lobe 33 engageable once each revolution thereof with an actuating rod 35 of switch means 37.

The switch 37 is in circuit with motor 30 and a source of energy 40 to energize motor upon closing contacts 42 and 43. Motor 30 is a high torque motor and capable in itself of driving crank through its work stroke. Due to being driven from the crank 14 by motor 24 which is continuously driven, motor 30 becomes instantaneously effective to drive crank without heat losses which would occur if starting torque were required each revolution.

Alternately, motor may be energized by actuation of a switch 47, similar to switch 37, having a push rod 48 in the path of slide 17, as shown in FIG. 3.

In operation, flywheel 19 is rotated upon energization of motor 24 by pushing start switch 25. When it is desired to connect the flywheel 19 to crank 14 to reciprocate slide 17 means are operated to engage clutch 20. In the event the clutch 20 is air or fluid operated, this means may take the form of a trip valve 52 connected to a pressure fluid supply by pipe 53. Valve 52 has a pedal 55 arranged, when depressed, to connect clutch supply pipe 56 to the pipe 53. Engagement of clutch 20 serves to set the press crank 14 in motion and at the same time rotate the shaft 28 of motor 30. As the slide 17 engages a normal work piece, motor 30 is energized and work load torque applied to the slide. Should an obstruction get in the path of the slide prior to energization of motor 30, clutch 20 will slip and downward movement of the ram or slide 17 will stop. As motor 24 is incapable of supplying work load torque to the ram, and motor 30 has not been energized, no damage to the press or dies will result. During normal operation, switch 37 or 47 will de-energize motor 30 upon completion of the work stroke of ram 17.

What is claimed is:

1. In a machine having a crank, a reciprocating ram, a flywheel on one end of said crank, means for continuously rotating said flywheel, a motor directly connected to the other end of said crank, a clutch for coupling said flywheel to said crank, said clutch being capable of slipping in the event of an obstruction in the path of said ram, means to engage said clutch for reciprocating said ram and setting said motor in motion, and means normally operable when the path of said ram is clear to energize said motor at a predetermined point in the reciprocation of said slide and to de-energize said motor at the completion of the work stroke of said slide.

2. In a press having a crank, a ram connected to said crank for reciprocation thereby, a flywheel at one end of said crank, clutch means between said flywheel and said crank, motor means for rotating said flywheel, the combination of second motor means directly connected to the other end of said crank, means to engage said clutch to drive said crank and said second motor means, an energizing circuit for said second motor means, switch means in said circuit, and means to close said switch means at a predetermined position of said crank to energize said second motor means to drive said crank through its work stroke and to open said switch at the end of said work stroke.

3. In a press having a crank, a ram connected to said crank for reciprocation thereby, a flywheel, a clutch means between said flywheel and one end of said crank, motor means for rotating said flywheel, the combination of second motor means directly connected to the other end of said crank, means to engage said clutch to drive said crank and set said second motor means in motion, said clutch being capable of slipping in the event of an obstruction in the path of said ram, an energizing circuit for said second motor means, switch means in said circuit, and means to close said switch means when said ram reaches a predetermined position and the path of said ram is clear to energize said second motor means to drive said crank through its work stroke and to open said switch at the end of said work stroke.

References Cited in the file of this patent

UNITED STATES PATENTS

| | | |
|---|---|---|
| 786,421 | Cutler | Apr. 4, 1905 |
| 1,063,632 | White | June 3, 1913 |
| 1,951,875 | Laabs | Mar. 20, 1934 |
| 2,056,559 | Berliner | Oct. 6, 1936 |
| 2,162,132 | Spire | June 13, 1939 |
| 2,366,272 | LeTourneau | Jan. 2, 1945 |
| 2,382,041 | Ernst | Aug. 14, 1945 |
| 2,780,114 | Breuer | Feb. 5, 1957 |